March 16, 1954  A. M. CHAMBERS, JR., ET AL  2,672,360
UNITARY ROTARY SEAL, INCLUDING BOTH STATIONARY
AND ROTATABLE SEALING RINGS
Filed Nov. 15, 1950
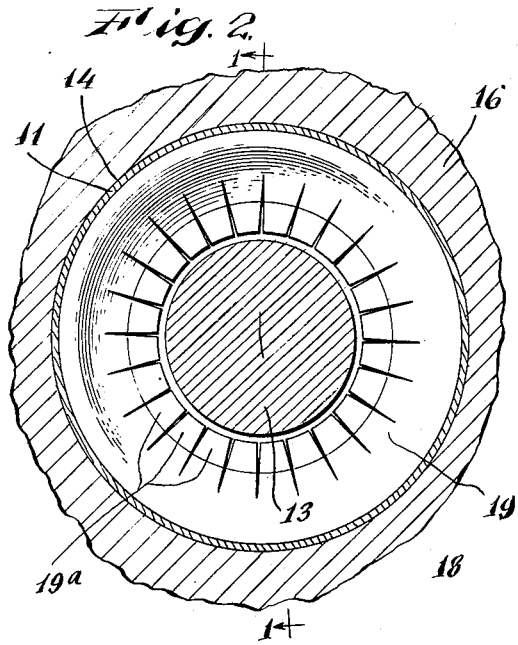
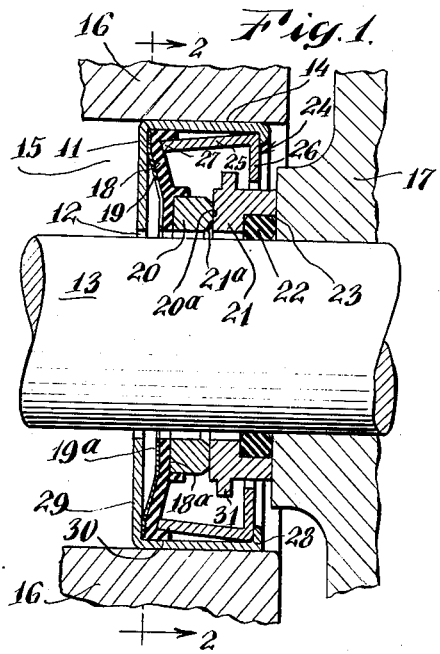
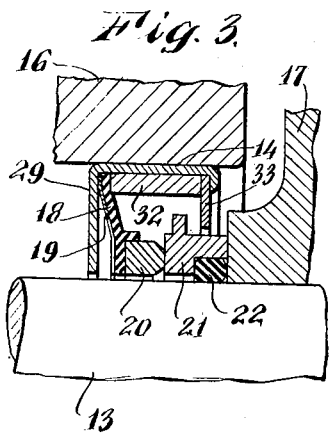
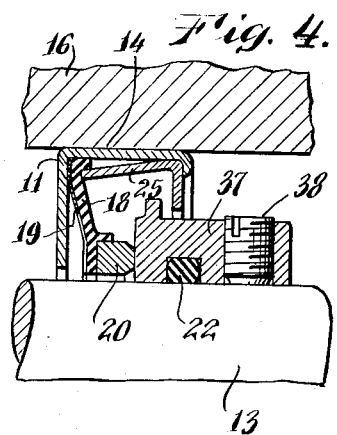
INVENTORS
Albert M. Chambers, Jr.
Harold F. Greiner
BY Karl C. Wizeman
Fraser, Myers & Manley
ATTORNEYS Patented Mar. 16, 1954

2,672,360

UNITED STATES PATENT OFFICE 2,672,360

UNITARY ROTARY SEAL, INCLUDING BOTH STATIONARY AND ROTATABLE SEALING RINGS

Albert M. Chambers, Jr., Palmyra, N. Y., Harold F. Greiner, Providence, R. I., and Karl C. Wizeman, Palmyra, N. Y., assignors to The Garlock Packing Company, Palmyra, N. Y., a corporation of New York Application November 15, 1950, Serial No. 195,794

1 Claim. (Cl. 288—3)

This invention relates to improvements in rotary seals such as are used for sealing an annular space between a rotatable shaft or the like and the surrounding cylindrical surface defining an opening in a machine casing through which the shaft extends. More particularly the invention is directed to the provision of such a seal in which the seal is manufactured as a complete package or unit which includes therewithin both a stationary sealing ring and a rotatable sealing ring which, in use, effect a running seal with each other.

Such unitary rotary seals heretofore developed have been quite complex because of considerable difficulties which are involved in disposing and retaining both the stationary and rotatable sealing rings within a single shell or container.

An important object of the present invention is the provision of such a unitary rotary seal which includes both a stationary sealing ring and a rotary sealing ring but which, nevertheless, is simple and inexpensive to produce.

Another important object of this invention is the provision of such a unitary rotary seal in which a single element serves as a medium by which both a stationary sealing ring and a rotary sealing ring are held within the device.

Another important object of this invention is the provision of such a unitary rotary seal in which one of the sealing rings therein is bonded to an annular finger spring to maintain said sealing ring substantially in concentric relationship to the axis of the shaft or of the machine casing opening through which the shaft extends.

Another important object of this invention is the provision of a unitary rotary seal in which a substantially flat spring is so associated with one of the sealing rings in the device and with a flexible, sealing diaphragm therein that the spring serves both to urge said sealing ring into effective running sealing engagement with another sealing ring in the device and to reinforce the diaphragm against being ruptured when subjected to relatively high fluid pressures and to twisting stresses.

Another important object of this invention is the provision of a unitary rotary seal in which a single element, which is adapted to hold two sealing rings in association with the device, also functions as a pressure member which tightly squeezes a portion of a flexible sealing diaphragm between it and a shell member of the device to effect a firm fluid seal between the diaphragm and the shell.

The foregoing and other objects are achieved by the present invention of which several embodiments are illustrated in the accompanying drawing; said embodiments being used herein only for illustrative purposes and without limiting the invention to such specific embodiments.

In the drawing:

Figure 1 is a central axial, sectional view of a preferred embodiment of a unitary rotary seal according to the present invention, the said section being substantially on the irregular line 1—1 of Fig. 2;

Fig. 2 is a radial sectional view of the device, substantially on the line 2—2 of Fig. 1; and Figs. 3 and 4 are central, axial, sectional views, generally similar in character to the upper portion of Fig. 1, but illustrating other of numerous possible modifications of the present invention.

Referring first to the embodiment of this invention illustrated in Figs. 1 and 2, the device comprises a cup-shaped outer shell or unifying element 11 formed with a central aperture 12, through which a shaft 13 may extend, and having an outer cylindrical wall 14 adapted to be substantially fluid-tightly press fitted into an opening 15 in a machine casing 16 which, for example, may be a casing of a pump or other mechanical device.

In Fig. 1, certain shiftable parts of the seal are illustrated in positions which they assume when the device is in operation and the device is shown as being arranged to effect a seal between the machine casing 16 and the shaft 13 upon which a pump impeller or other rotating machine element, shown fragmentarily at 17, is fixedly mounted for rotation therewith.

In addition to the shell 11, the device includes, within said shell, a flexible diaphragm 18 of relatively soft flexible rubber or rubber-like material (hereinafter referred to for convenience merely as "rubber"), an annular finger spring 19 of substantially flat spring metal formed with an inner peripheral series of spring fingers 19a and preferably molded to or otherwise adherently associated with the diaphragm 18, and a stationary sealing ring 20 which may be of bronze or other suitable rigid material, preferably adherently associated with the diaphragm within an annular recess 18a at the inner peripheral margin thereof.

A rotatable sealing ring 21 which may be of suitable metal, carbon, graphite or other rigid material also is disposed within the shell 11, with its sealing face 21a in opposed running sealing relation to a sealing face 20a of the stationary sealing ring. An O ring 22, of relatively soft, flexible rubber or rubber-like material of substantially circular cross-section when unflexed, is disposed within an internal annular recess 23 formed in the wear ring 21 and, when installed within a machine, is compressed and somewhat deformed radially between the rotatable sealing ring 21 and the surface of the shaft 13 for the dual purpose of effecting a substantially fixed seal between the two last mentioned parts and for causing the sealing ring 21 to rotate with the shaft.

The device also includes means for retaining the several parts 18, 19, 20 and 21 within the shell 11, the said means being in the form of a rigid retaining ring 24 which is angular in axial section with an axial flange 25 and an inwardly extending radial flange 26. The axial flange 25 may advantageously be frusto-conical but almost cylindrical in shape and disposed within the shell 11 with its free end 27 in engagement with one side of the diaphragm 18 toward the latter's outer periphery.

As the retaining ring is held in place in the shell by a rolled-in annular lip 28 on the free edge of the shell's cylindrical wall 14 and as the rolling-in of said lip forces the retaining ring leftwardly as viewed in Fig. 1, the latter ring squeezes the diaphragm very tightly against radial wall 29 of the shell which not only establishes a fluid-tight engagement of the diaphragm with the wall 29 but also distorts the outer marginal portion of the diaphragm to cause it to flow in the form of an annular tongue 30 which extends between and effects a fluid-tight seal between the axial flange 25 of the retaining ring and the inner surface of the shell's cylindrical wall 14.

If desired, the diaphragm as formed may be of somewhat greater diameter than the inside diameter of the wall 14, thus insuring that the tongue 30 will be of appreciable axial dimension; or the diaphragm may be molded initially with the tongue 30 formed thereon. In any of the several alternative arrangements just described, a very effective fluid seal is established between the diaphragm and the shell; and the spring 19, at its outer margin, is firmly clamped in place against the shell wall 29.

The rotatable sealing ring 21 is formed with a continuous outer, radial flange 31 having an outer over all diameter which is greater than the inside diameter of the flange 26 of the retaining ring. Thus, the rotatable sealing ring 21, as well as the parts 18, 19 and 20, is retained securely within the shell 14 at all times following completion of manufacture of the device as a unitary seal. The O ring 22 may be placed in the recess 23 at the factory and, with ordinary handling, it should stay in place because of its frictional engagement with the walls of said recess. However, it may be left for the workman to insert the O ring in place when the device is installed for operation in a machine.

Before the completed device is installed the spring 19 urges the inner marginal portion of the diaphragm 18, and the sealing ring 20 rightwardly, thereby pushing and holding the sealing ring 21 with its flange 31 against the retaining ring's flange 26. When the device is installed for use, as shown in Fig. 1, it is pushed rightwardly upon the shaft 13 until the outer end of the rotatable ring 21 abuts the opposed flat end surface of the impeller 17 or equivalent member and, then, somewhat further rightwardly against increased flexing of the spring fingers 19a to provide a substantial clearance between the flange 31 of the rotatable sealing ring and the radial flange 26 of the retaining ring.

It may be noted that, although the spring fingers 19a may be embedded in or bonded to the rubber diaphragm material, the softness of the latter material permits them to flex axially quite freely and to shift relatively to each other circumferentially in the presence of any relative axial movement of the shaft and the machine casing. Also, in embodiments in which a flat metal spring is embedded in or intimately associated with one side of the rubber diaphragm, the spring serves to reinforce the diaphragm against rupture even in the presence of relatively high pressure in the sealed fluid.

The embodiment illustrated in Fig. 3 differs from that of Fig. 1 only in that instead of the one piece retaining ring 24 there is provided a rigid cylindrical adapter or spacing ring 32 and a separate retaining washer 33. The adapter 32 presses against the outer margin of the diaphragm 18 and urges the spring 19 firmly into fluid-tight engagement with the radial wall 29 of the shell. In this construction, also, the axial pressure imposed by the adapter 32 on the diaphragm increases the force with which the outer periphery of the diaphragm engages the cylindrical wall 14 of the shell, thereby enhancing the seal therebetween at that circumferential location.

The embodiment illustrated in Fig. 4 differs from that of Fig. 1 principally in that a portion corresponding operatively with the rotatable sealing ring 21 of Fig. 1 is formed integrally with a collar adapted for fixation upon a shaft. Thus, the structure of Fig. 4 includes a rotatable sealing collar 37 held on the shaft 13 by a set screw 38. The sealing collar 37 is sealed with respect to the shaft and retained within the shell in the same manner as hereinbefore described with reference to the other embodiments.

It should be understood that, as with most types of shaft sealing devices, the present invention comprehends not only arrangements which, as illustrated, have the shell force fitted into a shaft opening in a machine casing, but also a reverse structure (not illustrated) in which the functional equivalent of the shell is force fitted upon a shaft and the sealing ring, which is fixedly associated with such shell-equivalent member, effects a running seal with an annular flat or radial surface formed about the shaft opening in the machine casing.

Without attempting to foresee all possible variations of this invention it may be observed that the flat spring need not necessarily be bonded to the rubber diaphragm. Such bonding is preferred, however, because, then, the spring functions as a positive means for preventing any material relative rotation between the sealing ring 20 and the shell 11 which might cause twisting distortion and consequent eventual rupture of the rubber diaphragm.

Those familiar with the art pertinent to this invention will readily appreciate that it may be embodied in a variety of sealing device structures. Hence, the invention should not be considered as involving limitations except as set forth in the following claim.

We claim:

A unitary device for sealing an annular space between two coaxial, relatively rotatable machine parts, comprising a rigid, annular, unifying element having a cylindrical wall adapted for substantially fluid-tight, fixed association with one of said machine parts, and an annular, radial wall at one end of the cylindrical wall, a flexible, annular, sealing member disposed with one of its peripheries within the angle defined by said walls and adjacent to the juncture of said walls in intimate association with both of the latter, and having an annular web which extends radially from said periphery within said angle and has a rear surface facing and in spaced relationship to said radial wall, a first sealing ring fluid-tightly associated with the flexible sealing member's other periphery, a second sealing ring adapted for substantially fluid-tight, fixed association with the other of said machine parts and for effecting a running seal with the first sealing ring, an annular spring, of resilient sheet material of substantially uniform thickness, having a flat marginal portion which is clamped between the said radial wall and an annular marginal portion of the flexible sealing member at the latter's said one periphery and having plural spring fingers, adapted for urging the first sealing ring toward the second sealing ring, which spring fingers extend radially from said marginal portion of the spring in intimate association with said rear surface of said flexible sealing member's web, substantially throughout the latter's radial dimension, and, collectively, are in intimate, fixed association with a major part of the circular dimension of the web's said rear surface, whereby to support the web against pressure and twisting forces, and a rigid retaining ring having a frusto-conical, axial flange one end of which is in contact with the said flexible sealing member adjacent to the latter's said one periphery in spaced relationship to said cylindrical wall, and the other end of which is in contact with said cylindrical wall toward the latter's other end, and the retaining ring having, also, a flange extending radially from the other end of the retaining ring's axial flange into substantial, axial alignment with a portion of the second sealing ring in position to engage the latter and limit its axial movement in a direction away from said radial wall; the free edge of the cylindrical wall having a radial extending portion in axial alignment with a portion of the retaining ring whereby to hold the latter in its mentioned relationship to the other parts of the device.

ALBERT M. CHAMBERS, Jr.
HAROLD F. GREINER.
KARL C. WIZEMAN.

References Cited in the file of this patent

UNITED STATES PATENTS

| Number | Name | Date |
| --- | --- | --- |
| 2,275,307 | Murden | Mar. 3, 1942 |
| 2,311,494 | Vedovell | Feb. 16, 1943 |
| 2,316,713 | Procter | Apr. 13, 1943 |
| 2,322,834 | Dornhafer | June 29, 1943 |
| 2,342,955 | Meyer | Feb. 29, 1944 |
| 2,395,359 | Vedovell | Feb. 19, 1946 |
| 2,419,385 | Beier | Apr. 22, 1947 |
| 2,479,968 | Schick | Aug. 23, 1949 |
| 2,489,781 | Isenbarger | Nov. 29, 1949 |
| 2,498,739 | Magnesen | Feb. 28, 1950 |